United States Patent
Snyder

(10) Patent No.: US 10,590,855 B2
(45) Date of Patent: Mar. 17, 2020

(54) DISTRIBUTED ELECTRICAL ARCHITECTURE FOR A GAS TURBINE ENGINE

(71) Applicant: United Technologies Corporation, Hartford, CT (US)

(72) Inventor: Ryan K. Snyder, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 737 days.

(21) Appl. No.: 14/612,755

(22) Filed: Feb. 3, 2015

(65) Prior Publication Data

US 2016/0222889 A1   Aug. 4, 2016

(51) Int. Cl.

| G05B 21/00 | (2006.01) |
|---|---|
| G01M 1/38 | (2006.01) |
| G05B 13/00 | (2006.01) |
| G05B 15/00 | (2006.01) |
| G05D 23/00 | (2006.01) |
| F02C 9/00 | (2006.01) |
| F02C 7/32 | (2006.01) |
| G05B 15/02 | (2006.01) |

(52) U.S. Cl.
CPC ............ *F02C 9/00* (2013.01); *F02C 7/32* (2013.01); *G05B 15/02* (2013.01); *F05D 2220/32* (2013.01); *F05D 2220/764* (2013.01); *F05D 2270/54* (2013.01); *Y02T 50/671* (2013.01)

(58) Field of Classification Search
CPC ...... F02C 9/00; F02C 9/28; F02C 9/16; F02C 7/32; G05B 11/01; G05B 15/02; G05B 21/02
See application file for complete search history.

(56) References Cited

U.S. PATENT DOCUMENTS

| 5,111,402 | A  | * | 5/1992  | Brooks .............. G01R 31/008 324/73.1 |
|---|---|---|---|---|
| 7,231,180 | B2 | * | 6/2007  | Benson ............... G01D 21/00 455/11.1 |
| 7,439,634 | B2 |   | 10/2008 | Michalko |
| 7,595,739 | B2 |   | 9/2009  | Ziarno |
| 7,734,287 | B2 |   | 6/2010  | Ying |
| 7,844,385 | B2 |   | 11/2010 | Loda et al. |
| 8,140,242 | B2 | * | 3/2012  | Cloft ................. F01D 17/20 123/492 |
| 8,295,995 | B2 |   | 10/2012 | Poisson |
| 8,456,051 | B2 |   | 6/2013  | Raad |
| 8,565,998 | B2 | * | 10/2013 | Brown .................. F02C 9/00 701/100 |

(Continued)

OTHER PUBLICATIONS

Extended European Search Report for European Application No. 16154046.3 dated Sep. 29, 2016.

*Primary Examiner* — Zhipeng Wang
(74) *Attorney, Agent, or Firm* — Carlson, Gaskey & Olds, P.C.

(57) ABSTRACT

A distributed electrical system includes a plurality of engine components each in electrical communication with one of a plurality of docking stations. An electronic engine control is positioned remote from the engine components and is configured to communicate wirelessly with each of the plurality of engine components.

20 Claims, 2 Drawing Sheets

(56) References Cited

U.S. PATENT DOCUMENTS

| | | | | |
|---|---|---|---|---|
| 8,826,774 | B1* | 9/2014 | Craig | A01G 25/09 |
| | | | | 74/606 R |
| 9,221,548 | B1* | 12/2015 | Sishtla | B64D 43/00 |
| 2004/0074665 | A1* | 4/2004 | Sugaya | H01R 23/661 |
| | | | | 174/72 A |
| 2005/0165534 | A1* | 7/2005 | Loda | G06Q 10/06 |
| | | | | 701/99 |
| 2006/0164030 | A1* | 7/2006 | Kujira | H02P 25/12 |
| | | | | 318/400.38 |
| 2006/0241845 | A1* | 10/2006 | Loda | F02C 9/00 |
| | | | | 701/100 |
| 2009/0292437 | A1* | 11/2009 | Cloft | F01D 17/20 |
| | | | | 701/100 |
| 2010/0049377 | A1 | 2/2010 | Scheid et al. | |
| 2010/0241331 | A1* | 9/2010 | Duke | F01D 25/18 |
| | | | | 701/100 |
| 2010/0242492 | A1* | 9/2010 | Sloat | F02C 7/12 |
| | | | | 60/793 |
| 2010/0274416 | A1* | 10/2010 | Poisson | B64D 31/14 |
| | | | | 701/3 |
| 2011/0089760 | A1* | 4/2011 | Castelaz | H02J 4/00 |
| | | | | 307/25 |
| 2012/0112575 | A1* | 5/2012 | Blewett | F02C 7/06 |
| | | | | 310/62 |
| 2013/0042628 | A1* | 2/2013 | Witlicki | F01D 17/08 |
| | | | | 60/796 |
| 2013/0190928 | A1* | 7/2013 | Beecroft | G05B 19/128 |
| | | | | 700/275 |
| 2014/0318296 | A1* | 10/2014 | Zweigle | F16H 61/0006 |
| | | | | 74/473.12 |
| 2015/0090222 | A1* | 4/2015 | Rebinsky | F02D 41/3005 |
| | | | | 123/435 |

* cited by examiner

DISTRIBUTED ELECTRICAL ARCHITECTURE FOR A GAS TURBINE ENGINE

BACKGROUND

Numerous distributed control architectures have been envisioned and proposed in the past for aircraft. However, reliability concerns and the need to protect electronics from harsh environments led to modern federated architecture as the industry standard. Typically, large military and commercial engines are controlled by an Electronic Engine Controller (EEC) or a Full Authority Digital Engine Control (FADEC), housed in a centralized location. Commercial requirements have evolved toward a singular electronic control mounted in the relatively benign environment of the fan case. Fan case mounting necessitates long wiring harnesses that must extend between the fan case and the engine core through an airfoil.

By default, the centralized EEC included all the connections for the engine and airframe. In this federated architecture, the EEC receives input from various sensors and issues commands to the appropriate actuators or subsystems, such as the fuel system. Electronic feedback is provided back to the EEC to confirm proper operation. The EEC performs inner-loop control of an actuator or subsystem, for example. As a result, modern EEC's are very large, heavy and application-specific making redesigns very costly. The interconnecting harnesses, likewise, are heavy, limit external packaging, inhibit easy component maintenance, subject to durability concerns and often aesthetically unpleasing. Therefore, there is a need to reduce the complexity and weight of the current systems.

SUMMARY

In one exemplary embodiment, a distributed electrical system includes a plurality of engine components each in electrical communication with one of a plurality of docking stations. An electronic engine control is positioned remote from the engine components and is configured to communicate wirelessly with each of the plurality of engine components.

In a further embodiment of the above, an electrical wiring harness electrically connects each of the plurality of docking stations with a power source.

In a further embodiment of any of the above, the power source is a permanent magnet alternator driven by a gearbox.

In a further embodiment of any of the above, the electrical wiring harness extends through internal passages in the gearbox to connect one of the plurality of engine components on the gearbox to the power source.

In a further embodiment of any of the above, a communications harness connects the electronic engine control to a wireless hub remote from the electronic engine control.

In a further embodiment of any of the above, the electronic engine control includes a wireless device that is configured to communicate wirelessly with each of the plurality of engine components.

In a further embodiment of any of the above, the wireless device is a radio frequency wireless device.

In a further embodiment of any of the above, the plurality of engine components includes at least one of a fuel pump, an actuator, and a sensor.

In another exemplary embodiment, a gas turbine engine includes a plurality of docking stations connected to an electrical wiring harness. An electronic engine control is connected to the docking stations. A plurality of engine components are each connected to one of the plurality of docking stations. The electronic engine control is configured to communicate wirelessly with each of the plurality of engine components.

In a further embodiment of any of the above, the electrical wiring harness is connected to a permanent magnet alternator driven by a gearbox.

In a further embodiment of any of the above, a communications harness connects the electronic engine control to a wireless hub.

In a further embodiment of any of the above, the wireless hub is located adjacent a core engine case.

In a further embodiment of any of the above, the electronic engine control includes a wireless device that is configured to communicate wirelessly with each of the plurality of engine components.

In a further embodiment of any of the above, the plurality of engine components includes at least one of a fuel pump, an actuator, or a sensor.

In a further embodiment of any of the above, the electronic engine control is located on one of a fan case, a plyon, or an aircraft.

In another exemplary embodiment, a method of operating a distributed electrical system includes powering an electronic engine control and at least one engine component with an electrical wiring harness. There is communication between the electronic engine control and the at least one engine component with at least one wireless signal.

In a further embodiment of any of the above, the electronic engine control and at least one engine component is connected to a docking station.

In a further embodiment of any of the above, the electronic engine control and the at least one engine component are powered by a permanent magnet alternator driven by a gearbox.

In a further embodiment of any of the above, the method includes communicating between the electronic engine control and the at least one engine component through a wireless hub connected to the electronic engine control through a dedicated communications harness.

In a further embodiment of any of the above, the electronic engine control is located adjacent a fan case and the wireless hub is located adjacent a core engine case.

The various features and advantages of this disclosure will become apparent to those skilled in the art from the following detailed description. The drawings that accompany the detailed description can be briefly described as follows.

DETAILED DESCRIPTION

Figure 1:
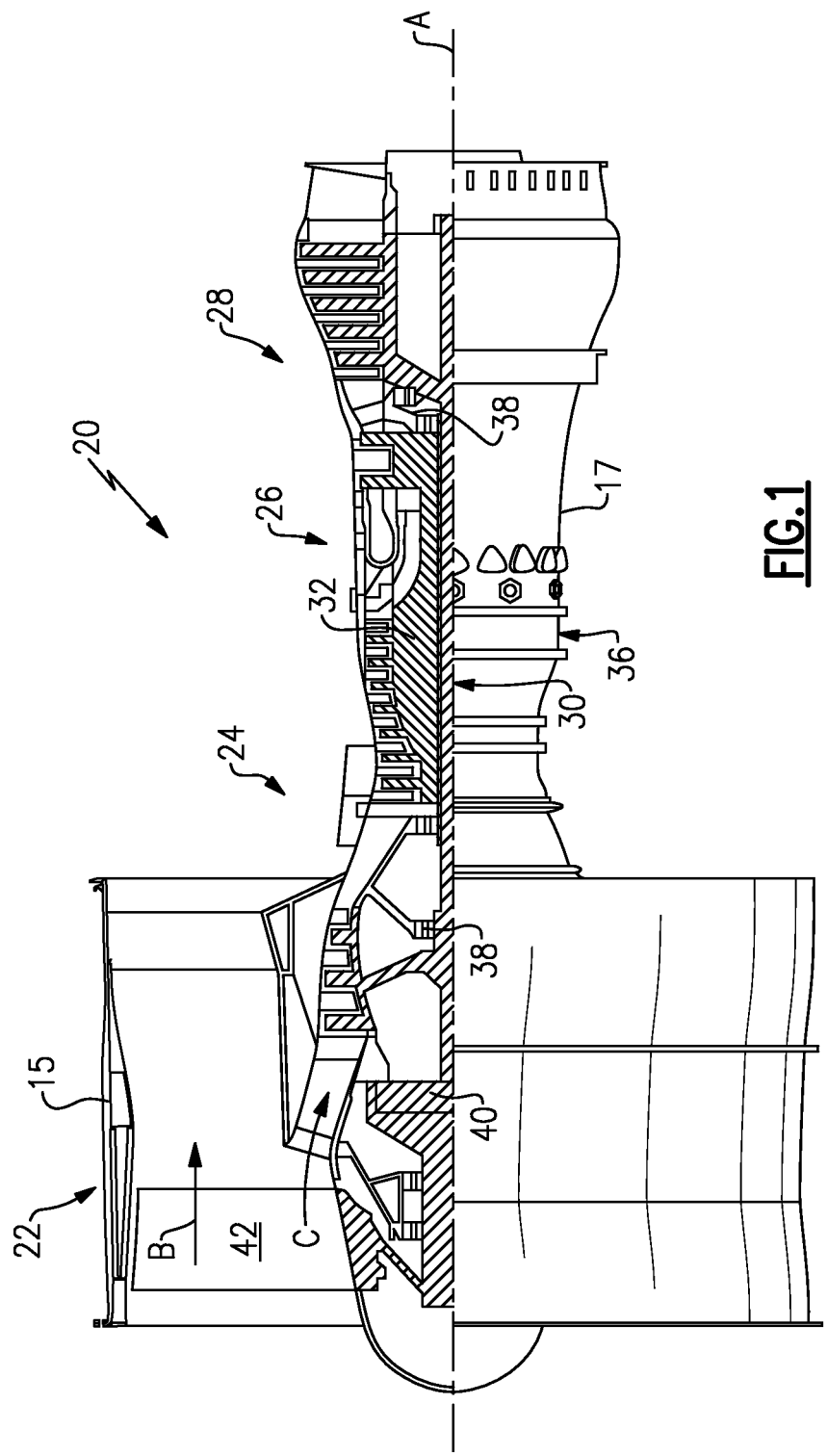
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a fan case 15 and located radially outward from a core engine case 17. The compressor section 24 drives air along a core flow path C for compression and communication into the combustor section 26 then expansion through the turbine section 28.

The exemplary gas turbine engine 20 generally includes a low speed spool 30 and a high speed spool 32 mounted for rotation about an engine central longitudinal axis A relative to an engine static structure 36 via several bearing systems 38. In the subject application, radial or radially is in reference to the engine central longitudinal axis A unless stated otherwise. The low speed spool 30 is in communication with a speed change mechanism 40, such as an epicyclic gear train, that allows a fan 42 on the fan section 22 to rotate at a lower speed than the low speed spool 30.

Figure 2:
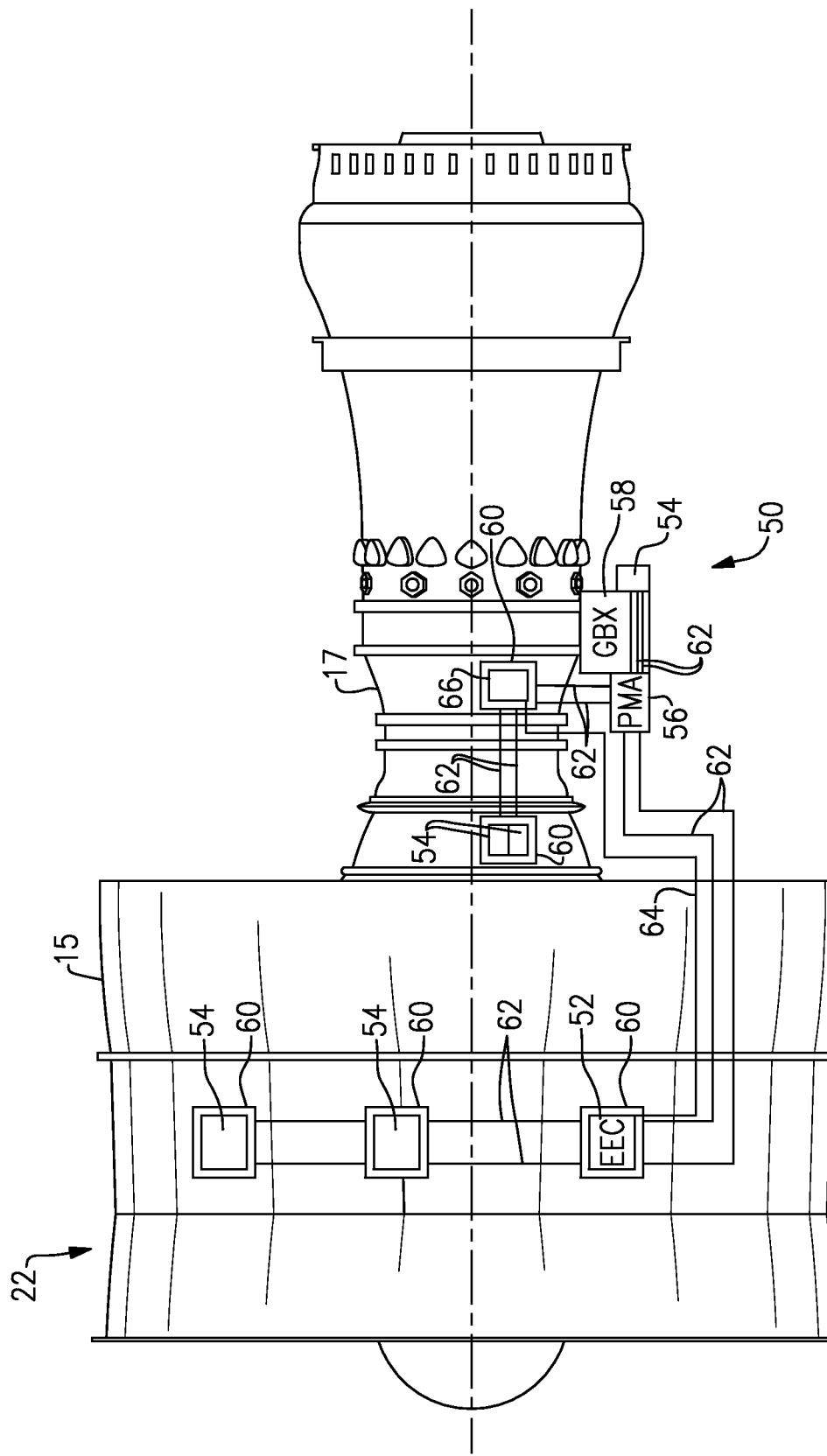
FIG. 2 is a schematic view of an electrical architecture for the gas turbine engine of FIG. 1.

FIG. 2 illustrates an example distributed electrical architecture 50 for the gas turbine engine 20. The electrical architecture 50 provides power to an electronic engine control (EEC) 52 and multiple other engine components 54, such as actuators, fuel pumps, and sensors. The electrical architecture 50 utilizes a power source, such as a permanent magnet alternator (PMA) 56 driven by a gearbox 58, driven by one of the low speed spool 30 or the high speed spool 32. The PMA 56 provides power to the EEC 52 and the engine components 54. The power generated by the PMA 56 is directed to multiple docking stations 60 on an exterior surface of the fan case 15 and an exterior surface of the core engine case 17.

The docking stations 60 are electrically connected to the PMA 56 by an electrical wiring harness 62. The wiring harness 62 may directly connect the docking station 60 to the PMA 56 or connect a series of docking stations 60 together. In the illustrated example, the wiring harness 62 includes a positive lead and negative lead. In another example, the wiring harness 62 includes a positive lead, a negative lead, and a neutral lead. The PMA 56 directs power through the wiring harness 62. The wiring harness 62 only provides electrical power between the PMA 56 and the docking stations 60 and does not provide communication between the docking stations 60 and the engine components 54.

The EEC 52 communicates with the other engine components 54 through at least one wireless connection formed between a wireless device integrated into the EEC 52 and a wireless device integrated into each of the engine components 54. The wireless connection could be created through the use of radio frequency technology. By utilizing wireless communication between the EEC 52 and the engine components 54, the size and complexity of the EEC 52 is greatly reduced. The wireless communication eliminates the need for a hard wire communications connection between the EEC 52 and each of the engine components 54.

By eliminating the hard wire communications connection, the need to dedicate a large portion of the EEC 52 to I/O ports is eliminated. This reduces the space required on the fan case 15 required to accept the EEC 52 as well as the complexity of installation and the need to route communications lines between the EEC 52 and all of the engine components 54 located both on the fan case 15 and the core engine case 17.

When the EEC 52 must communicate with other engine components 54 on the fan case 15, the wireless connection from the EEC 52 is sufficient to reach and communicate with the other engine components 54 on the fan case 15. When a distance between the EEC 52 and the engine component 54 is too large or a structure of the gas turbine engine 20 between the EEC 52 and the engine components 54 is blocking the wireless communication, a dedicated communications harness 64 can be utilized to connect the EEC 52 to a wireless hub 66. The EEC 52 will require at least as many I/O ports as there are wireless hubs 66 used on the gas turbine engine 20.

As shown in FIG. 2, the EEC 52 is located on the fan case 15 and only has a limited ability to transmit and receive wireless signals to and from engine components 54 of the core of the gas turbine engine 20. The EEC 52 can then use at least one wireless signal to communicate with the engine components 54 on the core engine case 17 by first transmitting the signal through the dedicated communications harness 64 to the wireless hub 66. The wireless hub 66 can then convert the signals from the EEC 52 to wireless signals, which can be sent to the appropriate engine component 54 on the core engine case 17.

Additionally, multiple wireless hubs 66 could be used on the core engine case 17 or even on the fan case 15 to communicate with engine components 54 on an opposite side of the fan case 15 from the EEC 52.

Each docking station 60 can provide power to one or more engine components 54 such that each engine component 54 does not require an individual docking station 60. By having each docking station 60 power more than one engine component 54, the number of docking stations 60 can be reduced. Linking multiple engine components 54 to a single docking station 60 is particularly useful for tightly packaged systems, such as fuel systems, which have multiple components that each require electrical power and must send and receive information from the EEC 52.

Some of the engine components 54 may also be mounted directly to the gearbox 58. By mounting the engine components 54 directly to the gearbox 58, a portion of the wiring harness 62 may be run internally through the gearbox 58. By running the portion of the wiring harness 62 internally through the gearbox 58, wires that would normally be susceptible to abrasion or damage on the exterior of the gearbox 58 can be protected inside the gearbox 58. Moreover, locating a portion of the wiring harness 62 internal to the gearbox 58 simplifies servicing the engine components 54 on the gearbox 58 by reducing the number of wires on an exterior of the gearbox 58.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A distributed electrical system comprising:
   a plurality of engine components each in electrical communication with one of a plurality of docking stations; and
   an electronic engine control positioned remote from the engine components and being configured to communicate wirelessly with each of the plurality of engine components;
   an electrical wiring harness electrically connecting each of the plurality of docking stations with a permanent magnet alternator driven by a gearbox and a portion of the electrical wiring harness extends through internal passages in the gearbox to connect one of the plurality of engine components on the gearbox to the power source.

2. The system of claim 1, the plurality of engine components includes at least one of a fuel pump or an actuator.

3. The system of claim 1, further comprising a communications harness configured to provide communication between the electronic engine control and a wireless hub remote from the electronic engine control.

4. The system of claim 1, wherein the electronic engine control includes a wireless device that is configured to communicate wirelessly with each of the plurality of engine components and the wireless device is a radio frequency wireless device.

5. A gas turbine engine comprising:
a plurality of docking stations connected to an electrical wiring harness;
an electronic engine control connected to the docking stations; and
a plurality of engine components each connected to one of the plurality of docking stations, wherein the electronic engine control is configured to communicate wirelessly with each of the plurality of engine components, wherein the electrical wiring harness electrically connects each of the docking stations with a permanent magnet alternator driven by a gearbox and a portion of the electrical wiring harness extends through internal passages in the gearbox to connect one of the plurality of engine components on the gearbox to the power source.

6. The gas turbine engine of claim 5, further comprising a communications harness configured to provide communication between the electronic engine control and a wireless hub.

7. The gas turbine engine of claim 6, wherein the wireless hub is located adjacent a core engine case on the gas turbine and the electronic engine control is located adjacent one of a fan case, a plyon, or an aircraft.

8. The gas turbine engine of claim 7, wherein the electronic engine control includes a wireless device that is configured to communicate wirelessly with each of the plurality of engine components.

9. The gas turbine engine of claim 5, wherein the plurality of engine components include at least one of a fuel pump or an actuator.

10. A method of operating a distributed electrical system comprising:
powering an electronic engine control and at least one engine component with an electrical wiring harness, wherein the electronic engine control and the at least one engine component are powered by a permanent magnet alternator driven by a gearbox and a portion of the electrical wiring harness extends through internal passages in the gearbox to connect the at least one engine component on the gearbox to the power source; and
communicating between the electronic engine control and the at least one engine component with at least one wireless signal.

11. The method of claim 10, further comprising connecting the electronic engine control to a first one of a plurality of docking stations and the at least one engine component to a second one of a plurality of docking station.

12. The method of claim 11, further comprising communicating between the electronic engine control and the at least one engine component through a wireless hub connected to the electronic engine control through a dedicated communications harness and the electronic engine control is located adjacent a fan case and the wireless hub is located adjacent a core engine case.

13. The system of claim 1, further comprising an electrical wiring harness electrically connecting each of the plurality of docking stations with a power source, wherein the electronic engine control includes a wireless device that is configured to communicate wirelessly with a wireless device integrated into each of the plurality of engine components.

14. The system of claim 3, wherein the electronic engine control is in electrical communication with a first docking station of the plurality of docking stations and the wireless hub is in electrical communication with a second docking station of the plurality of docking stations and the electrical wiring harness is spaced from the communications wiring harness.

15. The system of claim 3, wherein the plurality of engine components includes a first plurality of engine components in wireless communication with the electronic engine control through a wireless device and a second plurality of engine components in wireless communication with the wireless hub.

16. The gas turbine engine of claim 6, wherein the electronic engine control is in electrical communication with a first docking station of the plurality of docking stations and the wireless hub is in electrical communication with a second docking station of the plurality of docking stations and the electrical wiring harness is spaced from the communications wiring harness.

17. The gas turbine engine of claim 8, wherein the plurality of engine components includes a first plurality of engine components in wireless communication with the electronic engine control through the wireless device and a second plurality of engine components in wireless communication with the wireless hub.

18. The method of claim 12, wherein the electronic engine control is in electrical communication with a first docking station of the plurality of docking stations and the wireless hub is in electrical communication with a second docking station of the plurality of docking stations and the electrical wiring harness is spaced from the communications wiring harness.

19. The system of claim 1, the plurality of engine components includes at least one sensor.

20. The gas turbine engine of claim 5, wherein the plurality of engine components include at least one sensor.

* * * * *